US008608538B2

(12) United States Patent
Shuster et al.

(10) Patent No.: US 8,608,538 B2
(45) Date of Patent: Dec. 17, 2013

(54) GAMING METHOD

(75) Inventors: Gary Stephen Shuster, Fresno, CA (US); Brian Mark Shuster, Vancouver (CA)

(73) Assignee: Intellectual Ventures I LLC, Wilmington, DE (US)

( * ) Notice: Subject to any disclaimer, the term of this patent is extended or adjusted under 35 U.S.C. 154(b) by 60 days.

(21) Appl. No.: 13/185,273

(22) Filed: Jul. 18, 2011

(65) Prior Publication Data

US 2011/0269519 A1 Nov. 3, 2011

Related U.S. Application Data

(63) Continuation of application No. 11/530,415, filed on Sep. 8, 2006, now Pat. No. 7,980,934.

(60) Provisional application No. 60/715,682, filed on Sep. 8, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......... 463/16

(58) Field of Classification Search
USPC .......... 463/16, 42
See application file for complete search history.

(56) References Cited

U.S. PATENT DOCUMENTS

| | | | | |
|---|---|---|---|---|
| 5,810,360 | A | 9/1998 | Srichayaporn | |
| 6,165,069 | A * | 12/2000 | Sines et al. | 463/12 |
| 6,666,765 | B2 * | 12/2003 | Vancura | 463/9 |
| 6,846,238 | B2 | 1/2005 | Wells | |
| 7,217,187 | B2 | 5/2007 | Vancura | |
| 7,572,187 | B2 * | 8/2009 | Van Luchene | 463/42 |
| 7,980,934 | B2 | 7/2011 | Shuster et al. | |
| 2001/0000118 | A1 | 4/2001 | Sines et al. | |
| 2002/0119824 | A1 * | 8/2002 | Allen | 463/42 |
| 2002/0128057 | A1 | 9/2002 | Walker et al. | |
| 2003/0109310 | A1 * | 6/2003 | Heaton et al. | 463/42 |
| 2003/0199305 | A1 * | 10/2003 | Mathis | 463/20 |
| 2004/0082384 | A1 * | 4/2004 | Walker et al. | 463/40 |
| 2005/0181851 | A1 | 8/2005 | Amaitis et al. | |
| 2006/0014193 | A1 * | 1/2006 | Wagner | 435/6 |
| 2006/0025193 | A1 | 2/2006 | Gail et al. | |
| 2006/0025206 | A1 * | 2/2006 | Walker et al. | 463/20 |
| 2007/0228651 | A1 * | 10/2007 | Loose et al. | 273/143 R |

FOREIGN PATENT DOCUMENTS

WO WO 2007/030710 3/2007

OTHER PUBLICATIONS

Monte Carlo, http://physics.gac.edu/~huber/envision/instruct/montecar.htm.*
Fogel, David B. "Evolving Strategies in BlackJack" IEEE 2004.
Specification, U.S. Appl. No. 60/660,389.
International Preliminary Report on Patentability,and Written Opinion, PCT/US2006/35017, dated Sep. 13, 2007.

* cited by examiner

*Primary Examiner* — David L Lewis
*Assistant Examiner* — Reginald Renwick

(57) ABSTRACT

A gaming method operates to provide expert card-counting information to some or all participants, in exchange for a premium. The premium may be a cash payment, a reduction in the prize amount or betting odds, some combinations of the foregoing, or any other useful remuneration. The house retains its edge via the premium. The method may be implemented for play at a physical or virtual card table.

20 Claims, 2 Drawing Sheets

GAMING METHOD

CROSS-REFERENCE TO RELATED APPLICATIONS

This application is a continuation of U.S. application Ser. No. 11/530,415 filed Sep. 8, 2006 which claims priority pursuant to 35 U.S.C §119(e) to U.S. provisional application Ser. No. 60/715,682, filed Sep. 8, 2005, which applications are specifically incorporated herein, in their entirety, by reference.

BACKGROUND OF THE INVENTION

1. Field of the Invention

The present invention relates to a method for gaming using playing cards or the like, such as for casino use.

2. Description of the Related Art

Various casino games exist in which players compete against one another or the house to win a pot containing player bets. For example, many card games, such as blackjack or poker, fall into this category. Such games are usually designed such that over time, the law of averages guarantees that the house will take in more winnings than it pays out in bets. Thus, a professional player of such games, in theory, should not be able to win more than he bets over time.

However, many professional gamblers have proven that it is possible to win consistently, by developing a knowledge of the odds of various betting possibilities, along with some way of estimating more accurately than other players what the likelihood of a particular game outcome is in a given situation. Such professional players earn winnings from less knowledgeable players, and may be able to “beat the house” consistently. Hence, casino operators take measures to prevent use of methods for estimating game outcomes, such as card counting.

Card counting may be used in games of cards or the like, in which cards or game pieces are distributed to players from a finite set or deck, and set aside or recycle after game play. Several games may be played from the deck before the discarded cards are added back to the deck and the deck is reshuffled. In many such games, some information about the particular cards that have been drawn from the deck and used may be available to the players. A player trained in a card counting technique may be able to estimate the value of cards remaining in the deck by keeping track of cards that have already been dealt. As a deck is used up or recycled, a card counter may gain increasingly detailed information about cards remaining in the deck. An experienced card counter will therefore place higher bets during games in which more detailed information about remaining cards is known. While various card counting techniques exist, all of such methods involve keeping track of dealt cards to form an estimate of cards remaining in a deck.

Most people, however, are not able to make use of such advanced techniques such as card counting. Many less sophisticated players do not even understand basic principals of probability that should inform their game play. Thus, many potential players may be discouraged from playing certain casino games, for fear of losing to more knowledgeable players. It would therefore be desirable to provide an improved method of casino gaming for card games and other games of chance, that encourages more player participation, while still permitting the house to profit from hosting the game.

SUMMARY OF THE INVENTION

The invention provides a method and apparatus to improve casino gaming. The method may be desirable to both experienced and inexperienced players, and should operate to lessen the advantage that an experienced or specially-trained player may hold relative to a casual casino player.

The invention operates by providing expert gaming advice to players, such as via a private display screen, during the course of the game. The expert advice is generated by a computer, based on information about a current game state. The computer is not provided with enough information to predict the game outcome, but is provided with information sufficient for generating a probabilistic estimate of likely game outcomes. In an embodiment of the invention, the information provided to the computer includes information that is not easily accessible to an ordinary player, such as card-counting information.

In an embodiment of the invention, players are provided with the option to receive the expert information from the computer, in exchange for a wagering premium. The premium may comprise adjusting the betting odds so that the player’s bet does not pay quite as much as it would if the expert advice were not provided. For example, a player may be required to increase his wager amount at a lower than normal odds, or may simply pay a small fee for the information. The amount of the premium is selected such that the house retains its advantage over time. In an alternate embodiment, all players receive the expert information, and all pay a premium. For example, the payout schedule of the gaming might be adjusted for all players.

The house retains its winning edge by making the premium payment for this advice high enough to offset the edge the player gains from the expert information. It may appear to the player that he is winning more hands than he is losing, which is probably true. However, because the premium payment is high enough to offset these gains, the casino continues to profit on the game. In an embodiment of the invention, some portion or all of a premium fee is returned if the player loses. This alternative has the added benefit of making it appear to the player that the additional premium is a no-lose proposition for the player.

In a card-counting embodiment, an image scanning device may be used to image cards as they are shown at any point during a card game. The images of the cards may then be provided to the expert advice computer. That is, the computer may be given the same information as might be available to a professional card counter. Using an image analysis method to determine the value of the card played, the expert maintains a count of the shown cards, using any suitable card-counting method. Information from the card-counting method is then included in the expert advice provided to participating card players. The player who pays the premium may be told the optimum play for the cards they hold. For example, a player who holds a ten and a six in blackjack, while the dealer shows a two, may be advised not to hit if the computer has estimated that 70% of the remaining cards are worth ten or more. Similarly, if the computer knows that the remaining cards are rich in cars lower than 6, the player may be told that the best play is to hit. The player could also be provided probabilistic estimates of outcome, such as if you hit, you are 40% likely to win; if you stand, you are 45% likely to win. In an embodiment of the invention, players paying the premium play their cards after all players not paying premium, in order to prevent free riding on the advice given to the premium payers.

A more complete understanding of the gaming will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The invention provides a novel system and method for casino gaming, that overcomes the limitations of the prior art. Using the invention, a casino may provide players having any level of experience the same access to expert gaming advice, in exchange for a betting premium. Players may therefore participate in games of chance with the assurance that they are not disadvantaged by lack of experience, skill, or mental alertness.

Figure 1:
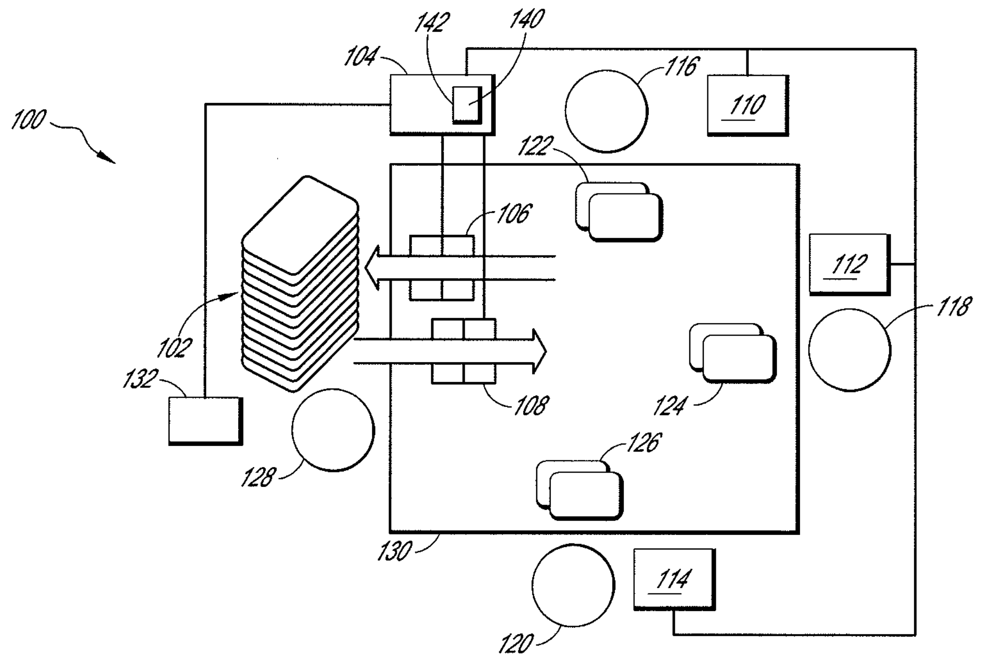
FIG. 1 is a block diagram showing an exemplary system for gaming according to the invention.

FIG. 1 shows a system 100 for gaming according to the invention, comprising a deck 102 of playing cards. Dealer 128 distributes cards 122, 124, 126 to one or more players 116, 118, 114. In the game of Blackjack, for example, the dealer may distribute two cards to each player, face down. After dealing the two cards, players are given an option to receive additional cards, face up. Various other card games and games of chance may also be played using system 100.

System 100 further comprises a computer 104 connected to one or more image scanning devices 106, 108. The scanning devices may comprise any device capable of generating an image of visible playing cards. For example, a scanner 108 may be placed on or in table 130, in a position where the dealer may pass or place playing cards as they are dealt. In the alternative, or in addition, a scanner 106 may be placed to scan cards as they are returned to deck 102 or discarded. An image of the card may be sent to 104 and analyzed to determine the card value, such as three of diamonds, queen of hearts, and so forth. Yet another alternative is to place a camera (not shown) in a position where it can image all or a portion of table 130. For example, a camera may be placed above table 130. At certain times in the game play, such as after every round in which new cards are placed face up on the table, the dealer 128 may activate the camera, which sends an image of the table to computer 104. The computer analyzes the image to identify new face-up cards and to ascertain their value.

As known in the art, software 140 for performing steps of the invention may be encoded on any suitable electronic media 142, for example, a magnetic media disk, and optical media disk, a memory chip, or other suitable media. When loaded into a working memory of computer 104, the software is operative to perform steps of the method as described herein.

Computer 104 may be provided with software or firmware for image analysis, from which card values may be determined using any suitable method. Computer 104 may further be provided with software or firmware for card counting using any suitable method. The card counting method should permit the computer to estimate relative values of cards in deck 102, but not to predict the value and position of cards in deck 102 with certainty. For example, the computer may determine that a portion of the deck contains a high proportion of face cards or aces, but should not be permitted to determine with certainty whether the next card in the deck is an ace or a face card. To this end, the computer should not be provided with perfect information about the value of cards in the deck. In the alternative, or in addition, some information provided to computer 104 may be segregated from information used in card counting. For example, computer 104 may be provided with the value of a participating player's 116 face-down cards 122, but only for the purpose of advising player 116 concerning playing his hand. Computer 104 would not be able to use the value of cards 122 in card counting until the cards have been shown to all the players at the table, such as after players have shown their hands. Of course, computer 104 should not be permitted to use the value of cards 122 to advise other players at table 130 during the course of the hand in which cards 122 are played. Computer 104 may thereby be configured to stand in the place of an expert gambler who observes table 130 and forms as optimal betting strategy, based only on information individually available to each of players 116, 118, 120, respectively, and an expert knowledge of the rules of the game being played. The computer should be configured so that each player is assigned a dedicated "virtual expert" that does not communicate any information known only to its assigned player to any other virtual expert participating in the game.

Computer 104 may also be operatively connected (e.g., via a wired or wireless connection) to one or more output devices 110, 112, 114. The output devices may compromise, for example, display screens or sound generators. Each player may be provided with a personal or private output device. In an embodiment of the invention, each player is provided with a handheld device comprising a display screen. In the alternative, or in addition, the output devices may comprise a headphone or earphone through which the player may receive betting advice. Devices 110, 112, 114 may also provide for user input, such as via a touchscreen, keypad, or the like. User input may be used, for example, to ask computer 104 to estimate the probability of outcomes for different player options, or to provide computer 104 with information concerning hidden values of player cards.

A dealer 128 or a neutral observer of the game may be provided with an input device 132, such as a control panel, for communicating the state of the game to computer 104. For example, the dealer may use a control panel to indicate when a new game has been dealt, when a new round of betting or new cards have been played, or when the game is finished. The control panel 128 may also be used to communicate the identity of players or their corresponding output devices that have elected to receive expert advice during a game. Deck 102 may be kept in a cardholder equipped with a scale or other sensor from which the computer may determine the number of cards remaining in the deck or when a card has been dealt. In an embodiment of the invention, computer 104 may be operatively connected to a machine for performing certain or all dealer functions, such as dealing, shuffling, paying out winnings, accepting bets, and so forth. Such an embodiment may be suitable for electronic gaming, such as gaming over a wide area network, in which players accept that games are computer-controlled, and there is no need to manage physical cards and chips. However, it is believed that machines capable of replacing human card dealers are not available for a physical casino environment, or would not be generally accepted by players even if available.

Figure 2:
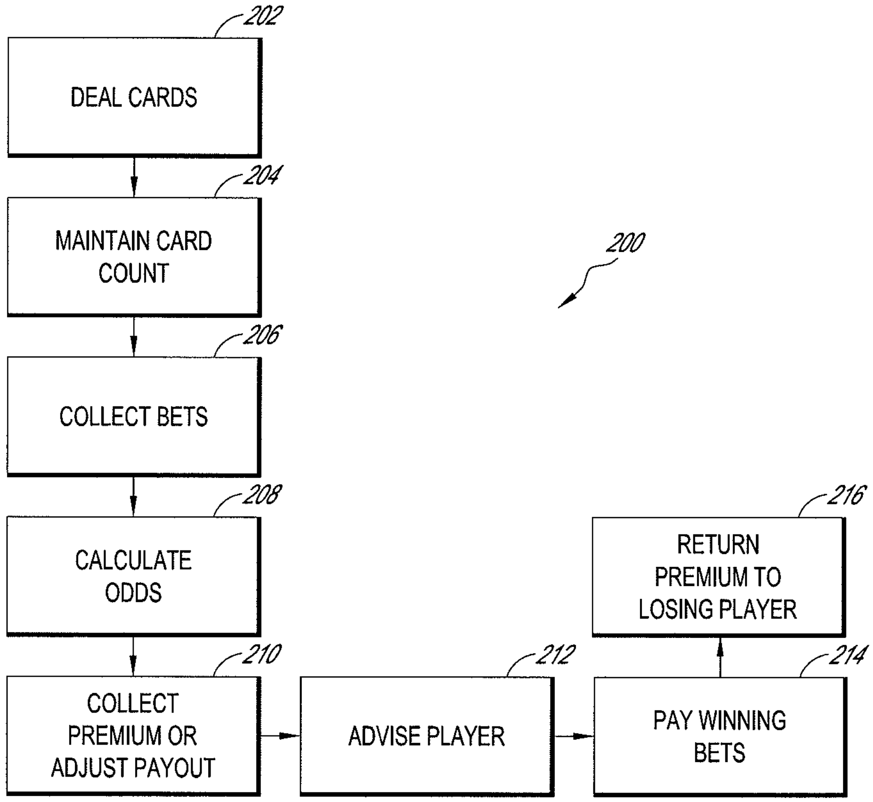
FIG. 2 is a flow chart showing exemplary steps of a gaming method according to the invention.

System 100 may be used to perform a method 200 according to the invention, exemplary steps of which are shown in FIG. 2. Exemplary steps 202-216 may be performed in any operative order, including but not limited to concurrently. At step 202, cards in a randomly-ordered deck (e.g., a shuffled deck) are dealt to players in any suitable manner, such as by using a human dealer, or using a pseudo-random generator if electronic cards are dealt. Cards that are dealt face-up may be scanned after being dealt, or as they are being dealt, and their images provided for use in a computerized card-counting method after first being analyzed to determine their value. In the alternative, the value of dealt cards may be provided directly to a computer by the dealer or a neutral observer of the game, using a suitable input device.

At step 204, any suitable card-counting method may be used to maintain a count of cards that have been shown. To be of value in game play, the method should determine a probabilistic estimate of the distribution of card values in the entire deck, or in a portion of the deck that is abut to be dealt. The card counting result may be maintained in the memory of a computer, and used to provide an estimate of the probability that the next card drawn will equal, exceed, or be less than a specified value. In the alternative, card-counting may be omitted. In such embodiments, advice about game play may be provided using the game rules alone. Such advice may be provided without requiring payment of a premium, to assist inexperienced players in learning more rational gaming strategies.

At set 206, bets may be collected in any suitable manner. For example, in a casino environment, players may place their bets on the table. In an electronic gaming environment, bets may be placed by electronically debiting a player's gaming account, as known in the art. At step 208, the computer may use card-counting data, game state data, and analysis algorithms based on the rules of the game in play to calculate optimal betting strategies for the hand at play, and player or house odds associated with the betting strategy. Calculated odds may be compared against baseline odds calculated without card-counting knowledge to develop an estimate of a premium amount that should be charged for a particular player hand or game. In the alternative, premium amounts may be set in advance for all games of a particular type, based on a statistical model developed from actual or simulated comparison of game play with and without the use of card-counting.

At step 210, the payout schedule may be adjusted based on the calculated change in odds, for players electing to receive expert advice. In alternative, a premium may be collected from such players in any suitable manner, such as used for collecting bets. In general, methods for adjusting payout schedules or the equivalent of charging a premium are known in the art of casino gaming. Any suitable method may be used. Normally payouts should be set to ensure profitability of the house, but exceptions to this are also within the scope of the invention.

At step 212, participating players are advised of the expert opinion determined by the computer. For example, in a game of Blackjack, a player may be advised to stand or hold. A player may also be advised to increase the bet amount, or advised of a basis for the recommended action. For example, the computer might provide a message stating "there is a 70% chance that the next card will be a ten or a face card." Advice may be provided in essentially an unlimited number of ways. Advice provided to one player should not be provided to other players. In addition, it is desirable that it not be obvious when a player is receiving advice. For example, advice may be provided through an earpiece, or on a shielded view screen located near the player's cards.

At step 214, winning bets are paid at the conclusion of the game in a conventional fashion, using an adjusted payout schedule if determined at step 210. If a premium has been collected from any players who did not win, the premium may be returned to or credited to the losing player at step 216. Returning premiums to losing players may encourage use of the premium system as a "no-lose" proposition, and thereby stimulate additional revenue or interest in the game being played.

Figure 3:
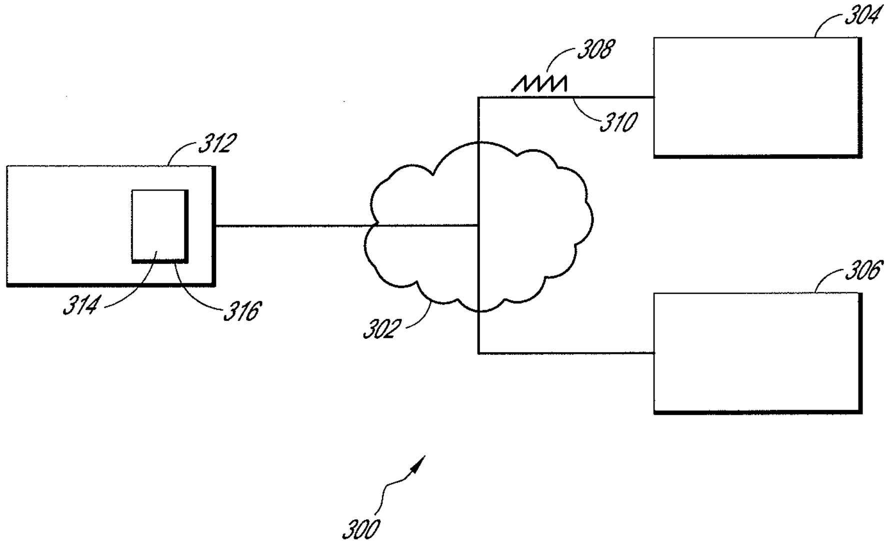
FIG. 3 is a schematic diagram showing a system for performing a method of the invention, and subsystems thereof.

FIG. 3. shows an exemplary system 300 for providing betting advice during remote play of an electronic card game. A game host 312 operates software 314 encoded on a suitable electronic media article 316, such as a magnetic media disk, an optical disk, memory chip, or the like. The host 312 communicates via a network 302 with a plurality of clients 304, 306 (two of many shown) to play a series of simulated card games in which betting advice is provided according to the methods and systems disclosed herein. Clients 304, 306 may comprise network thick or thin clients as known in the art, configured with suitable software for connecting with host 312 and interacting with the host via an interface. A suitable interface may be provided using web browser software operating on a general purpose or specialized computer, or in any other suitable manner.

An aspect of remote game play is that the invention may be embodied as a carrier signal 308 over a wired or wireless connection 310 for any player, e.g. a player using client 304. The carrier signal is operative, when provided to a client computer 304, with a player interface operative for playing card games. In the games, a plurality of simulated playing cards from a fixed deck are dealt in rounds to a plurality of players, each player receiving one or more cards in each round. Each simulated playing card has a defined value and suit. Public cards are also communicated to the players as ones of the simulated playing cards that are revealed to all players. The carrier signal operates to communicate a value and suit of public playing cards during games, and to provide providing betting advice to at least one player during the games in exchange for a premium paid to the game host operating host 312. As disclosed above, the betting advice may be determined at least in part based on data comprising: a composition of the fixed deck, a recorded value and suit of the public playing cards, and the value and suit of ones of the playing cards held by the at least one player just prior to providing the betting advice. Other details of the invention as disclosed herein may be adapted for implementation as software 314 on an electronic media article 316 or as a communications signal 308 by one of ordinary skill in the art.

Having thus described a preferred embodiment of an improved gaming method, it should be apparent to those skilled in the art that certain advantages of the within system have been achieved. It should also be appreciated that various modifications, adaptations, and alternative embodiments thereof may be made within the scope and spirit of the present invention. For example, a card game method has been illustrated but it should be apparent that the inventive concepts described above would be equally applicable to other games of chance. The invention is defined by the following claims.

What is claimed is:

1. A method, comprising:

a computer system receiving values of public game pieces revealed to one or more players during one or more games played with a type of game pieces belonging to a finite set;

receiving, at the computer system, an indication that a player wishes to receive betting advice in exchange for a premium;

the computer system determining the betting advice based at least in part on the received values of the public game pieces;

the computer system conveying the betting advice to the player during a particular game played with the type of game pieces belonging to the finite set; and based on information indicating that the player did not win a wager relating to the betting advice, the computer system causing at least a portion of the premium to be refunded to the player.

2. The method of claim 1, wherein determining the betting advice includes comparing odds calculated with game piece counting knowledge against baseline odds calculated without game piece counting knowledge.

3. The method of claim 1, wherein the game pieces belonging to the finite set comprise a deck of cards, and wherein determining the betting advice includes using a card counting algorithm.

4. The method of claim 1, wherein the premium is collected prior to the player having an opportunity to place the wager.

5. The method of claim 1, wherein the premium comprises an amount taken based on a lower payout schedule for the particular game.

6. The method of claim 1, wherein the premium is collected at least in part as a portion of winnings won by the given player on the wager.

7. The method of claim 1, wherein the betting advice comprises a probabilistic estimate of at least one player's chances of holding a winning hand.

8. The method of claim 1, wherein the betting advice is conveyed via a private electronic display.

9. The method of claim 1, further comprising the computer system, prior to the player having an opportunity to place the wager, causing a plurality of playing game pieces to be dealt to a plurality of players via an electronic interface.

10. The method of claim 1, further comprising:

causing the entire premium to be refunded if the player did not win the wager.

11. A system, comprising:

a processor; and a computer-readable storage medium having instructions stored thereon that are executable by the processor to cause the system to:

receive a request from a player for betting advice in exchange for a premium;

determine the betting advice based on one or more values of public game pieces corresponding to one or more games played with a type of game pieces belonging to a finite set;

provide the betting advice to the player during a particular game played with the type of game pieces belonging to the finite set; and based on information indicating that the player did not win a wager relating to the betting advice, causing at least a portion of the premium to be refunded to the player.

12. The system of claim 11, wherein the instructions are executable to cause the system to select an amount of the premium to maintain house odds by comparing odds calculated with card-counting knowledge against baseline odds calculated without card-counting knowledge.

13. The system of claim 11, wherein determining the betting advice is based on one or more values of one or more private games pieces belonging to the player.

14. The system of claim 11, wherein the instructions are executable to cause the system to withhold a portion of winnings won by the at least one player as the premium.

15. The system of claim 11, wherein the system further comprises an optical recognition device configured to detect the values of playing cards.

16. A non-transitory computer-readable storage medium having stored thereon instructions that are executable by a computer system to cause the computer system to perform operations comprising:

receiving values of public game pieces revealed to one or more players during one or more games played with a type of game pieces belonging to a finite set;

receiving an indication that a player wishes to receive betting advice in exchange for a premium;

determining the betting advice based at least in part on the received values of the public game pieces;

conveying the betting advice to the player during a particular game played with the type of game pieces belonging to the finite set; and based on information indicating that the player did not win a wager relating to the betting advice, causing at least a portion of the premium to be refunded to the player.

17. The non-transitory computer-readable storage medium of claim 16, wherein the operations further comprise optically recognizing the values of the public game pieces.

18. The non-transitory computer-readable storage medium of claim 16, wherein the betting advice is conveyed to the player via a private audio and/or video output device.

19. The non-transitory computer-readable storage medium of claim 16, wherein the operations further comprise determining the betting advice based on one or more simulated wager outcomes.

20. The non-transitory computer-readable storage medium of claim 16, wherein causing the at least a portion of the premium to be refunded to the player comprises not debiting the at least a portion of the premium from the player before the player places the wager.

* * * * *